Jan. 10, 1933.    O. DIAZ    1,893,668
CAMERA
Filed Nov. 28, 1927    10 Sheets-Sheet 3

Inventor
Octaviano Diaz
By his Attorneys
Bohleber & Ledbetter

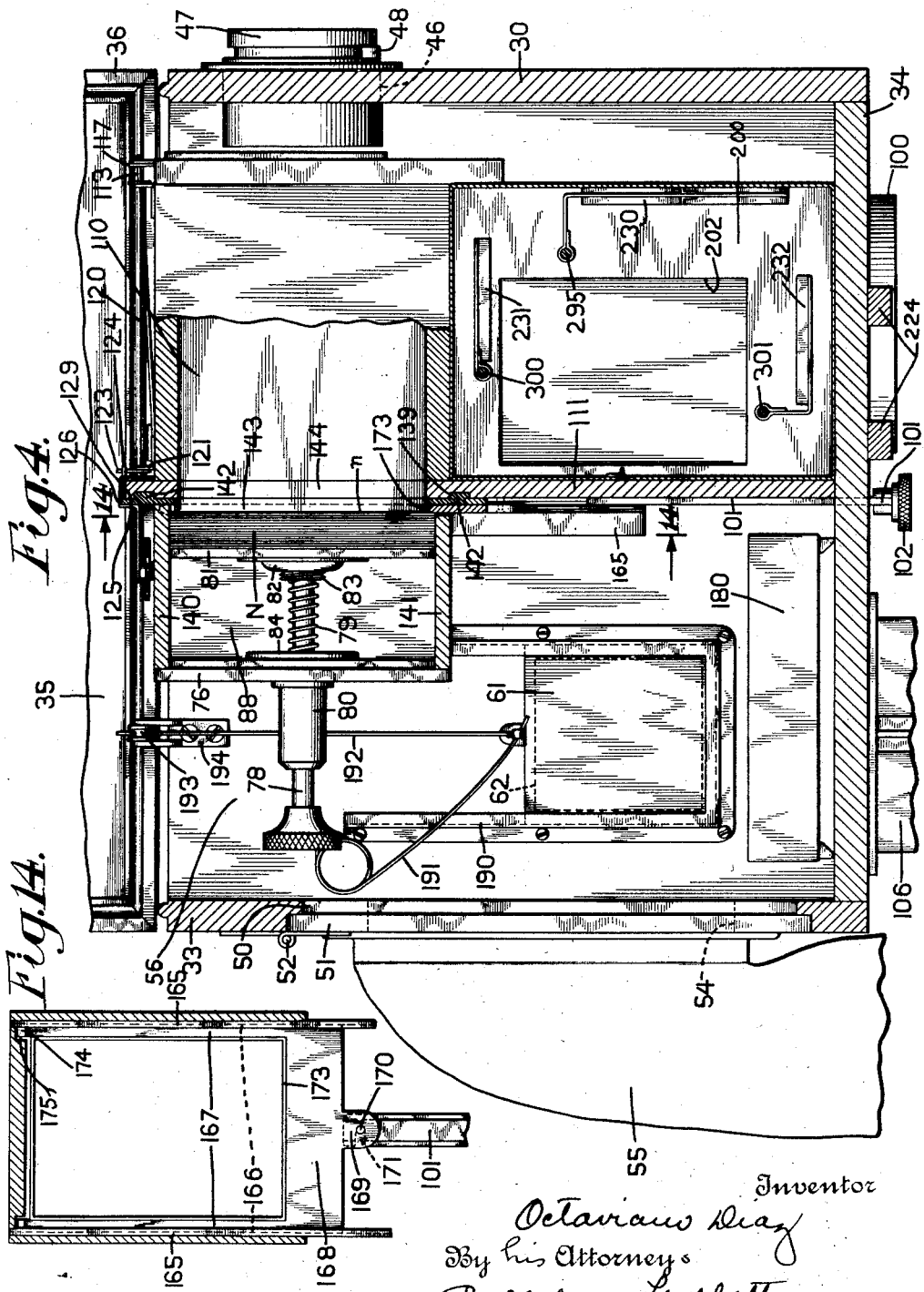

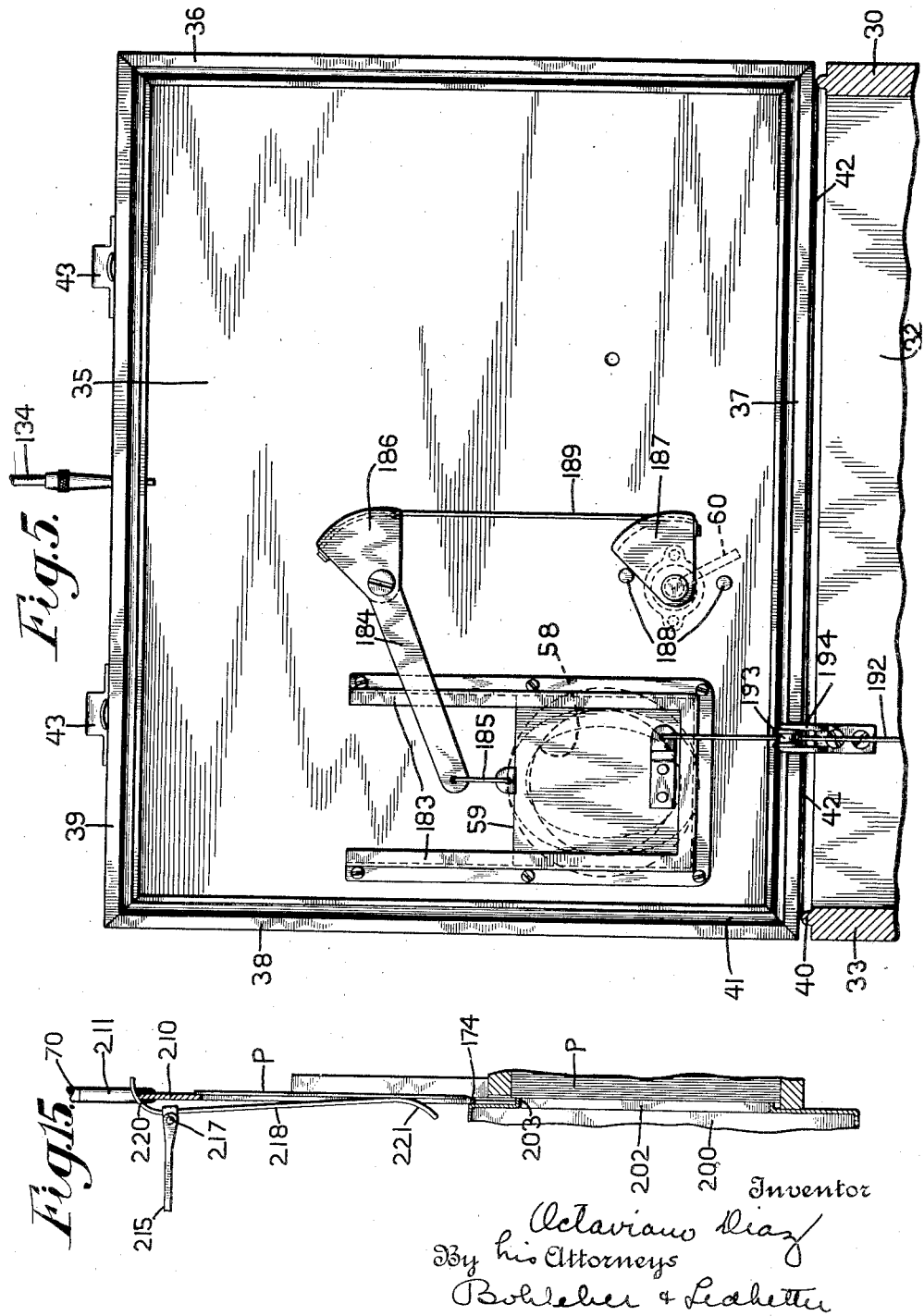

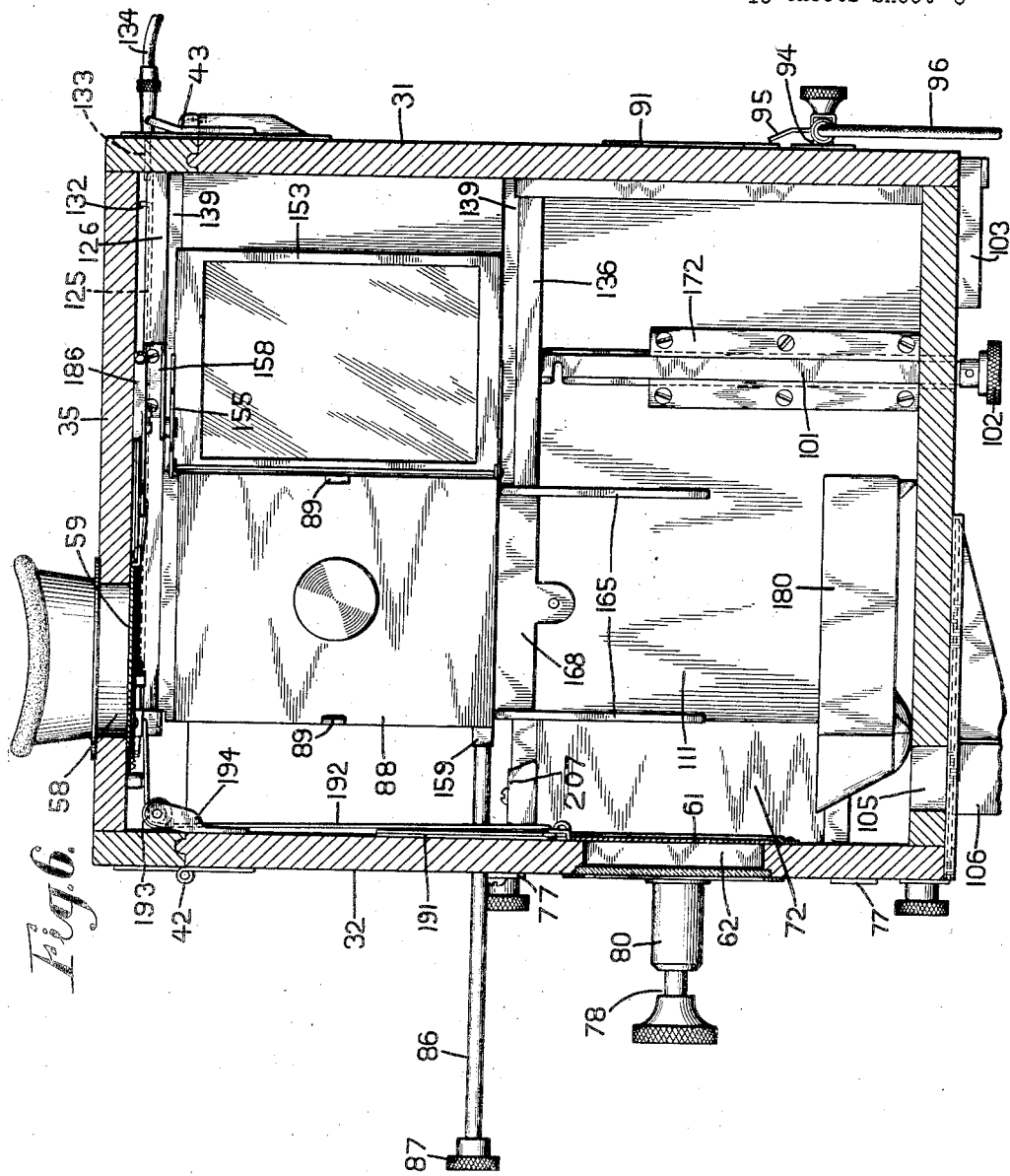

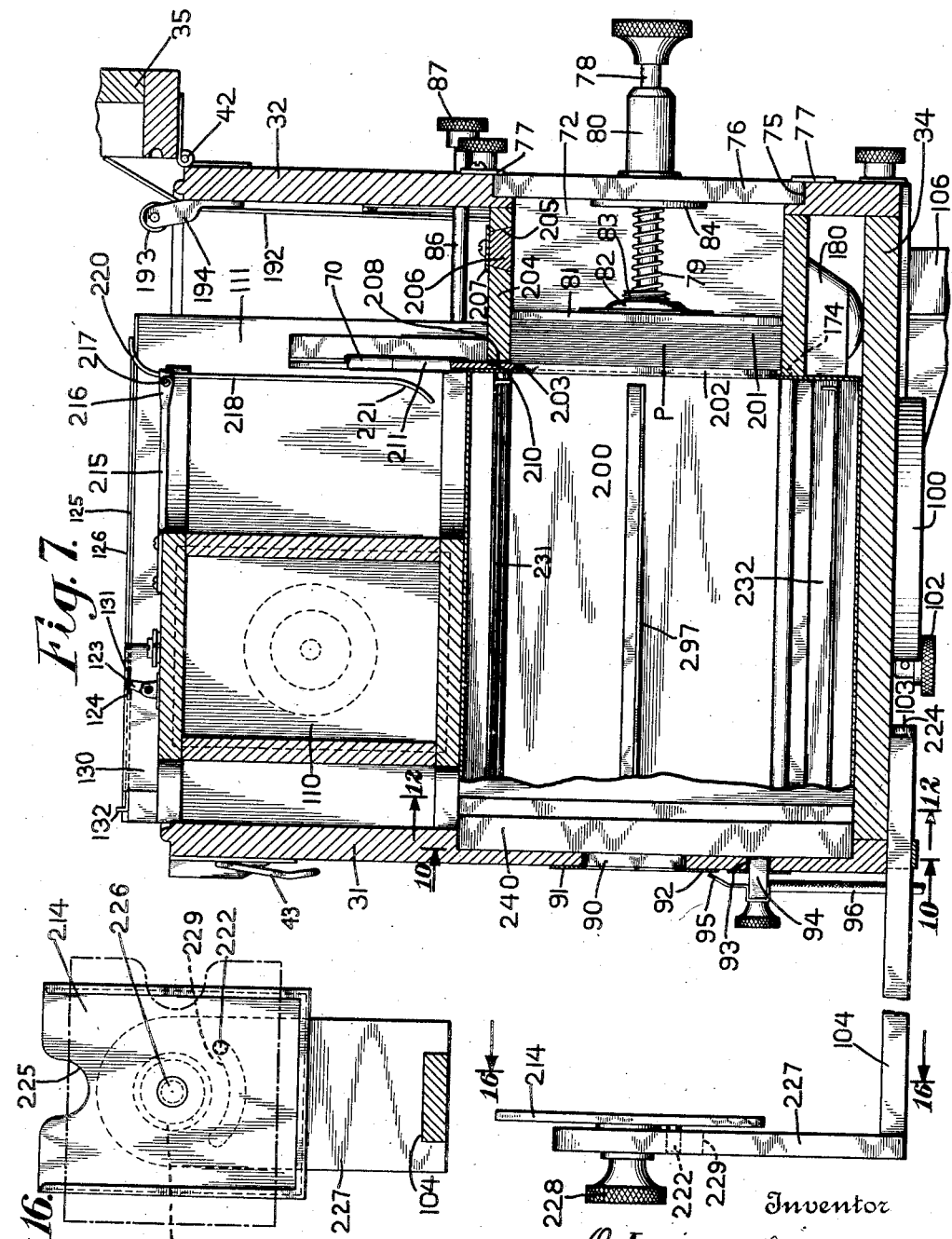

Jan. 10, 1933.    O. DIAZ    1,893,668
CAMERA
Filed Nov. 28, 1927    10 Sheets-Sheet 8
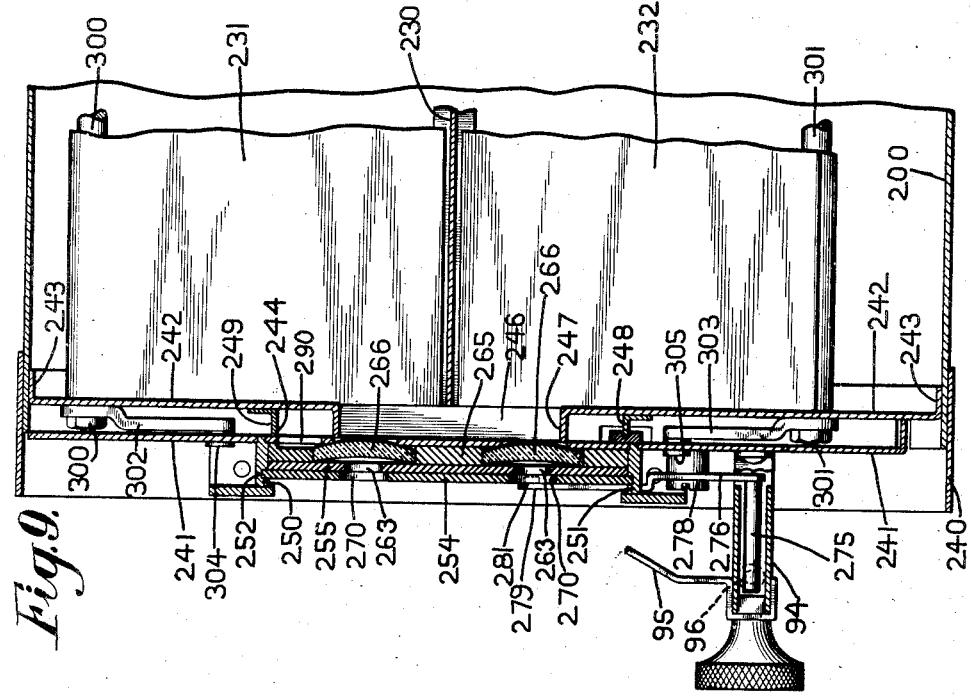
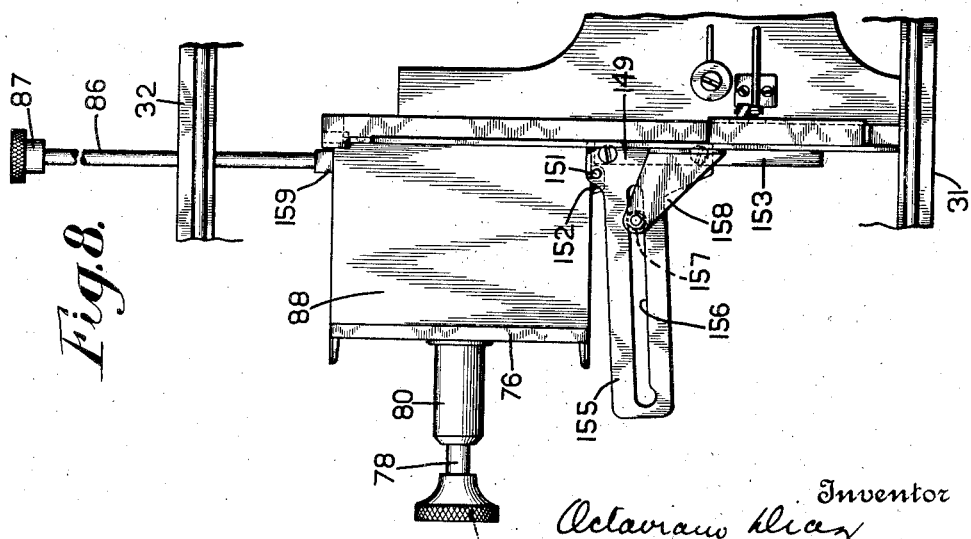
Inventor
Octaviano Diaz
By his Attorneys
Bohleber & Leahette Jan. 10, 1933.   O. DIAZ   1,893,668
CAMERA
Filed Nov. 28, 1927   10 Sheets-Sheet 9

Inventor
Octaviano Diaz
By his Attorneys
Bohleber & Ledbetter

Jan. 10, 1933.   O. DIAZ   1,893,668
CAMERA
Filed Nov. 28, 1927   10 Sheets—Sheet 10
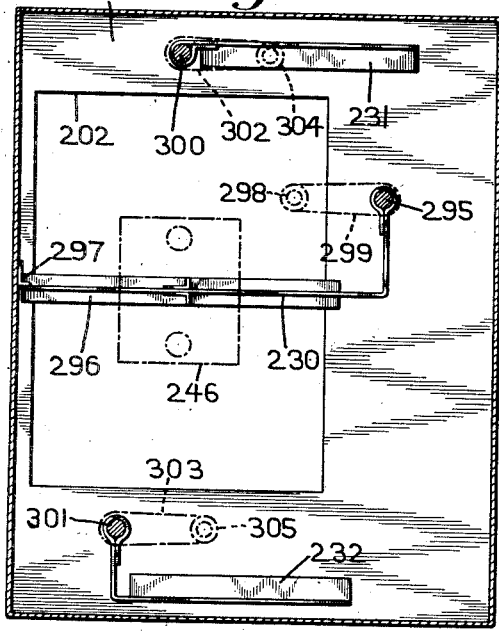
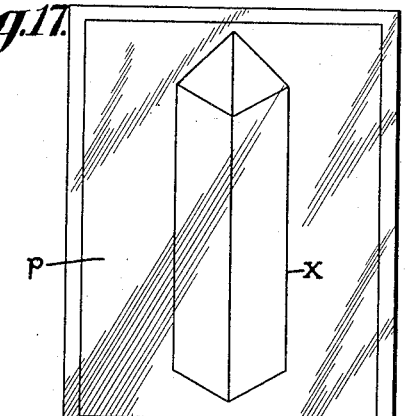
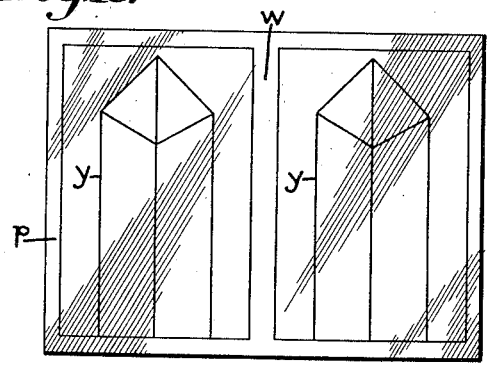
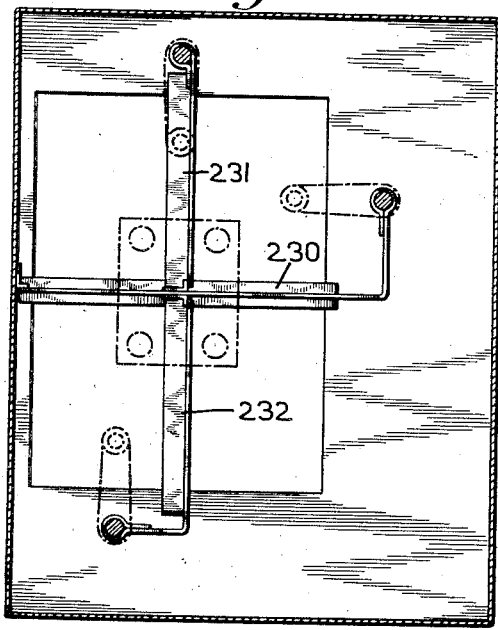
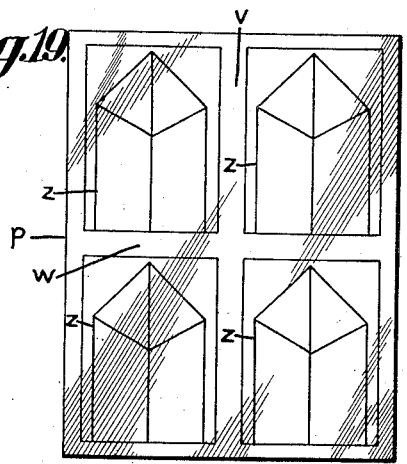
Inventor
Octaviano Diaz
By his Attorneys
Bohleber & Ledbetter Patented Jan. 10, 1933

1,893,668

UNITED STATES PATENT OFFICE

OCTAVIANO DIAZ, OF ANTOFAGASTA, CHILE

CAMERA

Application filed November 28, 1927, Serial No. 236,329, and in Chile November 29, 1926.

This invention relates to cameras and has for its primary object the provision of a camera, suitable, say, for an itinerant photographer, and capable of performing all of the steps necessary to the production of a finished photograph. To this end the camera embodies within itself, as a self contained entity, all of the means whereby a sensitized surface may be exposed to form a negative, the negative developed and a positive produced therefrom and finished.

Another object of the invention is the production of one or a plurality of positives upon a single sheet from one negative in a single operation. Accordingly a plurality of groups of lenses, whereof the number in each group differs, are adapted to be selectively brought into focus upon a sensitized sheet to form one or more positive reproductions of a lone negative, the size of the respective positives being proportionately reduced in direct relation with the number thereof desired upon the sheet.

A further object of the invention is the use, in a conveniently portable camera, of a ground glass in conjunction with a magazine for a plurality of sensitized surfaces upon which negatives are to be formed whereby the ground glass may be automatically disposed behind the lens for the purpose of focusing the camera when the magazine is displaced for that purpose and the ground glass displaced when a negative is to be made, said parts being confined within the restricted space defined by the walls of the camera.

The invention also seeks the production of positive pictures through the instrumentality of lenses. To this end a negative is adapted to be carried on a support without the camera and at one focal point of a lens mounted in the wall thereof, and shutter means and actuating mechanism therefor are provided whereby a sensitized surface within the camera may be exposed for the production of a positive.

A further object of the invention is the provision, in a camera, of a magazine adapted to contain a plurality of sensitized sheets from which said sheets may be ejected in sequence to a position convenient for further manipulation and treatment.

Still another object of the invention is the automatic subdivision of the camera proper into a plurality of cameras for the production of a like number of pictures upon a single sensitized sheet. In accordance with this aspect of the invention the camera is provided with a plurality of partitions movable into position to subdivide the camera to correspond to the number of lenses moved into operative position and the movement of the partitions is dependent upon the movement of the lenses.

The invention also seeks convenient means whereby positives are reproduced from the negative in the aforesaid manner but wherein the relative proportions of the images remain constant in the several pictures although, in the vertical dimension, a lesser or greater proportion of the image is reproduced. Thus, in a situation say where a single three quarter length picture may be formed on a sheet as a positive, where two positives are to be formed on a single sheet, the features will be commensurate in size, but the photographs will represent a half length portrait. Similarly where four pictures are to appear on a single sheet, the head and shoulders only will be represented although such head and shoulders will be identical in size with the head and shoulder portion of the single image on the sheet.

This invention also has to do with a camera of the character described which is practical from the standpoint of ease and economy of manufacture and which shall be substantial and convenient in use and readily transportable.

These and other objects of the invention and the means for their attainment will be more apparent from the following detailed description taken in connection with the accompanying drawings illustrating one embodiment thereof whereby the invention may be practiced and in which:

Figure 4 is a view in longitudinal vertical section taken in a plane indicated by the line 4—4 in Figure 3 and looking in the direction of the arrows and showing particularly the negative making mechanism and the developing chamber.

Figure 5 is a plan view of the cover, looking from below, and showing actuating devices whereby a peep-hole in the cover may be uncovered to permit examination of the interior of the working space or developing chamber.

Figure 6 is a transverse vertical sectional view taken in the plane indicated by the line 6—6 in Figure 3 and looking in the direction of the arrows and showing particularly the magazine and the ground glass in position for focusing the camera.

Figure 7 is a transverse vertical sectional view taken in the plane indicated by the broken line 7—7 of Figure 3 and showing particularly the mechanism whereby positive pictures are formed.

Figure 8 is a fragmentary view, looking from above, and showing in plan the magazine for sensitized sheets upon which negative images are formed, together with the ground glass plate which may be used in focusing the camera, the magazine being shown as displaced and the ground glass plate in position in contradistinction to the position of the same parts shown in Figure 3.

Figure 9 is a fragmentary transverse vertical sectional view taken in the plane indicated by the line 9—9 in Figure 11 and showing particularly the mechanism including lenses and shutters by which one or more positive prints are made upon one size of sensitized sheet from a single negative.

Figure 12 is a longitudinal vertical sectional view taken in the plane indicated by the line 12—12 in Figure 7 and showing the arrangement of partitions behind the lenses disclosed in Figures 10 and 11 for the purpose of subdividing the sheet upon which the positive images are to be formed and with the parts arranged for forming two pictures upon a sheet.

Figure 13 is a view similar to Figure 12 but showing the movable partitions in position to effect the formation of four images.

Figure 14 is a view in elevation showing the ejecting device for the magazine and taken in the vertical transverse plane indicated by the line 14—14 in Figure 4.

Figure 15 is a view showing the ejecting mechanism for the magazine in position whereby the sensitized sheet is fully withdrawn from the magazine and about to be acted upon by a deflecting device to flip the sheet from the ejector.

Figure 16 is a view in elevation showing an adjustable frame for the negative image bearing sheet taken in the plane indicated by the line 16—16 in Figure 7.

Figures 17, 18 and 19 are views showing the positive images which may be produced by the camera of this invention upon sheets of uniform size.

Figure 1:
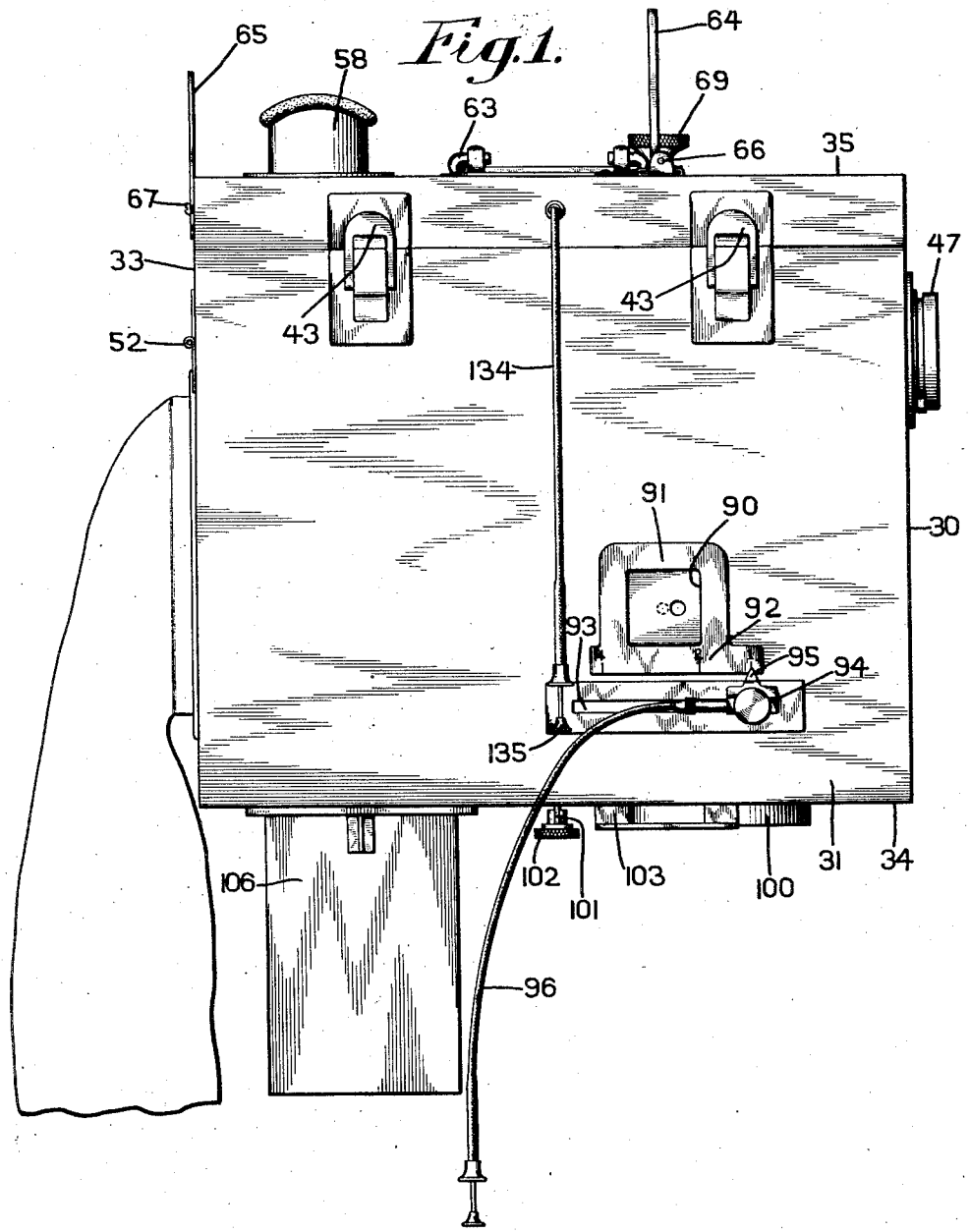
Figure 1 is a view in side elevation of the camera in accordance with this invention and showing the right hand side thereof.
Figure 2:
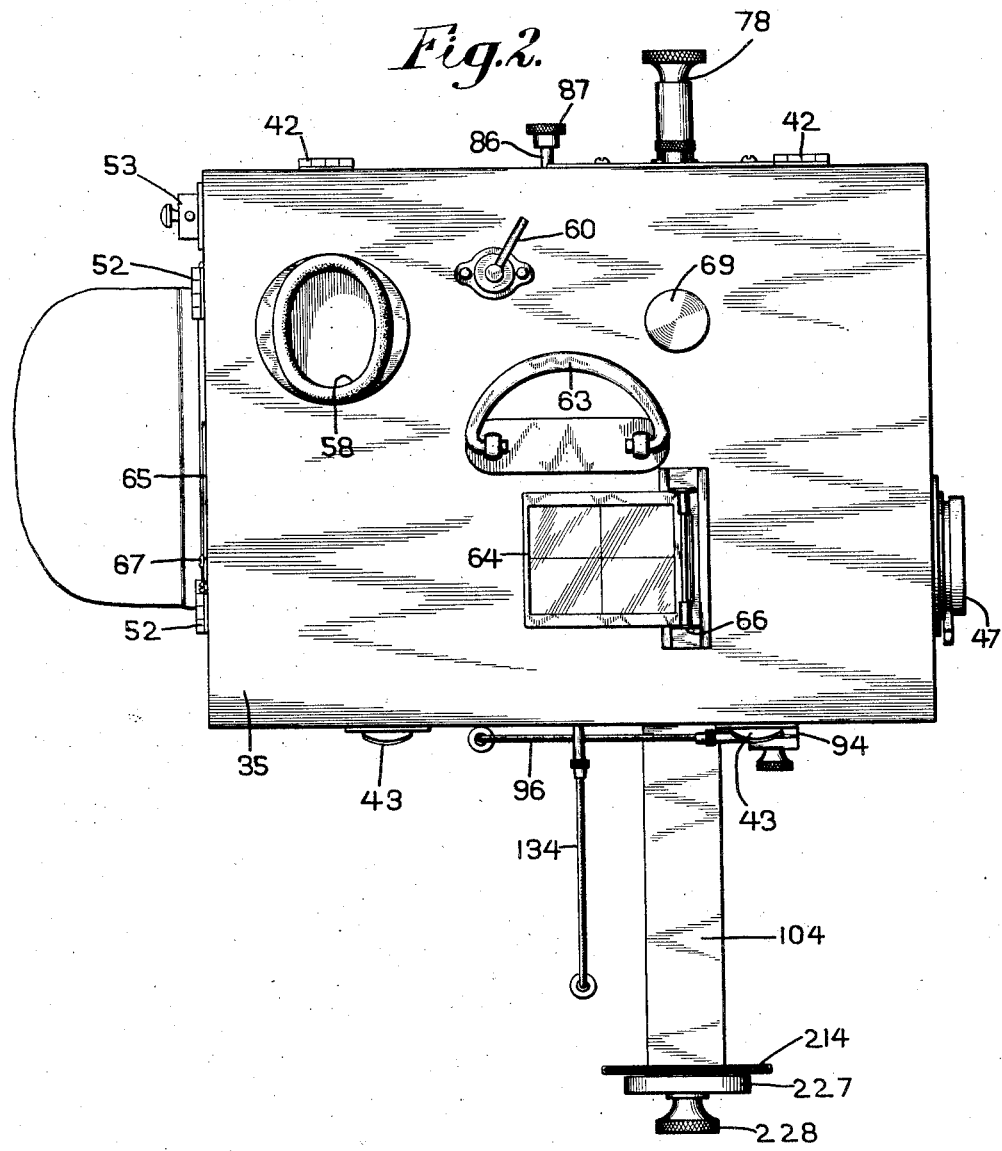
Figure 2 is a plan view of the camera, looking from above, and showing the top and cover.

The camera in accordance with this invention performs the following functions. It may be focused upon an object and a negative image thereof formed upon a sensitized sheet, such as bromide paper, contained within a magazine. From the magazine, the exposed sheet may be ejected into a developing chamber, to which access may be had without the admission of light, where the negative may be developed and fixed in the usual manner. One or a plurality of positive images may also be formed upon a sensitized sheet from the original negative. The negative may be set up at proper distance before a series of groups of lenses differing in number which may be selectively brought into position whereby either a single positive image may be formed upon a sensitized sheet, or two positive images formed upon the same size sheet or four positive images so formed, the necessary number of lenses being brought into operable position by suitable devices which also subdivide the space between the lens and the sensitized sheet for the purpose of dividing the sheet into spaces for the reception of the images thereon.

In the following discussion that end 30 of the box containing the camera as a complete entity and carrying the lens for the formation of negatives will be denoted in the front of the camera and the respective sides will be denoted right and left with respect to that front, that is, as when looking from the rear to the front, and irrespective of the position of the parts in any view of the drawings.

The invention will now be described with respect to the several mechanisms combined to form the camera as a complete entity.

*The camera box or housing*

Referring particularly to Figures 1 to 5 it will be observed that the various mechanisms are all contained within the box formed of the right and left side walls 31 and 32, respectively, and the front end wall 30 and the rear wall 33 and a bottom 34 and whereof the top is capable of being open but is closed by a cover 35, such as shown in Figure 5, having flanges 36, 37, 38 and 39, respectively, about its edges adapted to rest upon the top edges of the side and end walls 31, 32 and 30 and 33, respectively. The joint between the cover 35 and the walls of the box may be sealed against the admission of light by a tongue and groove connection comprising for instance the bead or tongue 40 carried on the top of the side and end walls of the body of the box which may be received within the groove 41 formed in the bottom surface of the flanges 36, 37, 38 and 39 of the cover 35. The cover is hinged to one side wall, say 32, as at 42, 42 and is adapted to be secured in closed position in any convenient fashion as by the latches 43, 43 carried with the opposite side wall, say 31, of the body of the box.

The front wall 30 is solid with the exception of an aperture 46 in which the lens unit 47 is carried, this lens unit being of any convenient commercial form desired and having preferably on its outer end means, such as the arm 48, whereby the size of the lens opening may be adjusted.

The rear wall 33 may be formed with an opening 50 closed by a door 51 hinged, say, at its top as at 52, 52 and secured by any convenient latch 53 say at the bottom. Within the hinged door 51 there is preferably formed a circular hand hole 54 carrying a sleeve 55 through which the hand may be inserted to perform the necessary operations of developing and fixing an exposed sensitized sheet within a developing chamber 56 hereinafter more fully described.

A cover 35 of the box is formed with a peephole 58 toward the rear end through which the interior of the developing chamber 56 may be viewed when a shutter 59, Figure 5, is displaced, the shutter 59 being actuated by means of the handle 60 disposed adjacent thereto and the movement of the shutter 59 serving also to displace a shutter 61, Figure 4, from a window 62 in the left side wall 32 through which light may be admitted to the interior of the developing chamber, 56, the window 62 being closed by a suitably colored glass to prevent the admission of light rays of a color having a deleterious effect upon the exposed sensitized sheet being developed or fixed in the chamber. The cover may also conveniently carry a handle 63 by which the box may be carried and front and rear sights 64 and 65, respectively, which are pivoted as at 66 and 67, respectively, whereby a general focus may be obtained. There is also found in the top 35 a knurled knob 69 which is carried upon the outer end of an actuating rod 70, Figure 3, slidable through the top and reciprocable to actuate ejecting devices of a magazine 72 adapted to contain the sensitized sheets upon which the positive pictures are formed in the camera.

The left hand side wall 32 is shown in section in Figure 7 and from the interior of the box in Figure 4. This wall 32 is also formed with an opening 75 through which the magazine 72 for the sensitized sheets for positive images may be inserted and removed. The closure 76 for this opening is removably secured in position by the displaceable overlapping plates 77 and carries a plunger 78 pressed inwardly by the spring 79 coiled thereabout which bears at its outer end against the end of a tubular bearing 80 carried by the closure 76. The follower 81 of the magazine 72 as mounted on plunger 78 preferably by means of a pivoted or swivelling connection 82 whereby the follower 81 is angularly movable with respect to the plunger 78 for convenience in insertion and removal through the opening 75. The plunger 78 also carries, adjacent the swivelling connection 82, a male threaded part 83 adapted for engagement, when the plunger is retracted, with a correspondingly threaded female part 84 carried by the closure 76 so that when it is desired to remove the plunger and its associated parts, the plunger may be first retracted with respect to the closure and the parts 83 and 84 caused to engage by rotation of the plunger. The follower structure may then be readily removed in convenient fashion. Through the wall 32 there also projects the magazine actuating rod 86 having at its end the knob or knurled handle 87 by which the magazine 88, for the sensitized sheets upon which negative images are formed, is displaced from behind the lens 47 whereby the focus may be obtained.

The right hand side wall 31, (Figure 1) is formed with an aperture 90 behind which the groups of lenses and shutter openings, hereinafter to be described, may be disposed and by which the formation of the different groups of positive images is effected, as shown in Figures 17 through 19. This aperture 90 may be bordered on a metallic frame 91, one side of which bears the scale 92 indicating the position of the reflective groups of lenses. Below aperture 90 the wall 31 is slotted, as at 93, for the passage of a slide 94 by which a desired group of lenses may be brought into operative position behind aperture 90. This slide carries an index 95 and is formed with a passage for shutter actuating connections, not shown, but which are operated from the Bowden wire 96 removably carried therewith as will be understood.

Referring now to Figures 1 and 7 the devices carried with the bottom 34 of the box are shown as comprising a general cylindrical bearing 100 upon which the box may be carried on a tripod. Through the bottom there reciprocates a slide 101 having the knob 102 and by which exposed sensitized sheets may be ejected from the magazine 88. A bracket 103 is also carried immediately beneath the aperture 90 within which a frame 104 may telescope. This frame supports the negatives from which the positive pictures are formed, as will be hereafter more fully described. Also passing attached to the bottom 34 and projecting therebeneath is a fixing bath 106. This bath is accessible from within the "dark room" space 56 by means of the opening 105 formed therein and is removable. It may comprise a narrow, preferably rectangular, removable chamber of a size to receive one of the sensitized sheets after exposure disposed in a general vertical plane.

The negative forming mechanism

Figure 3:
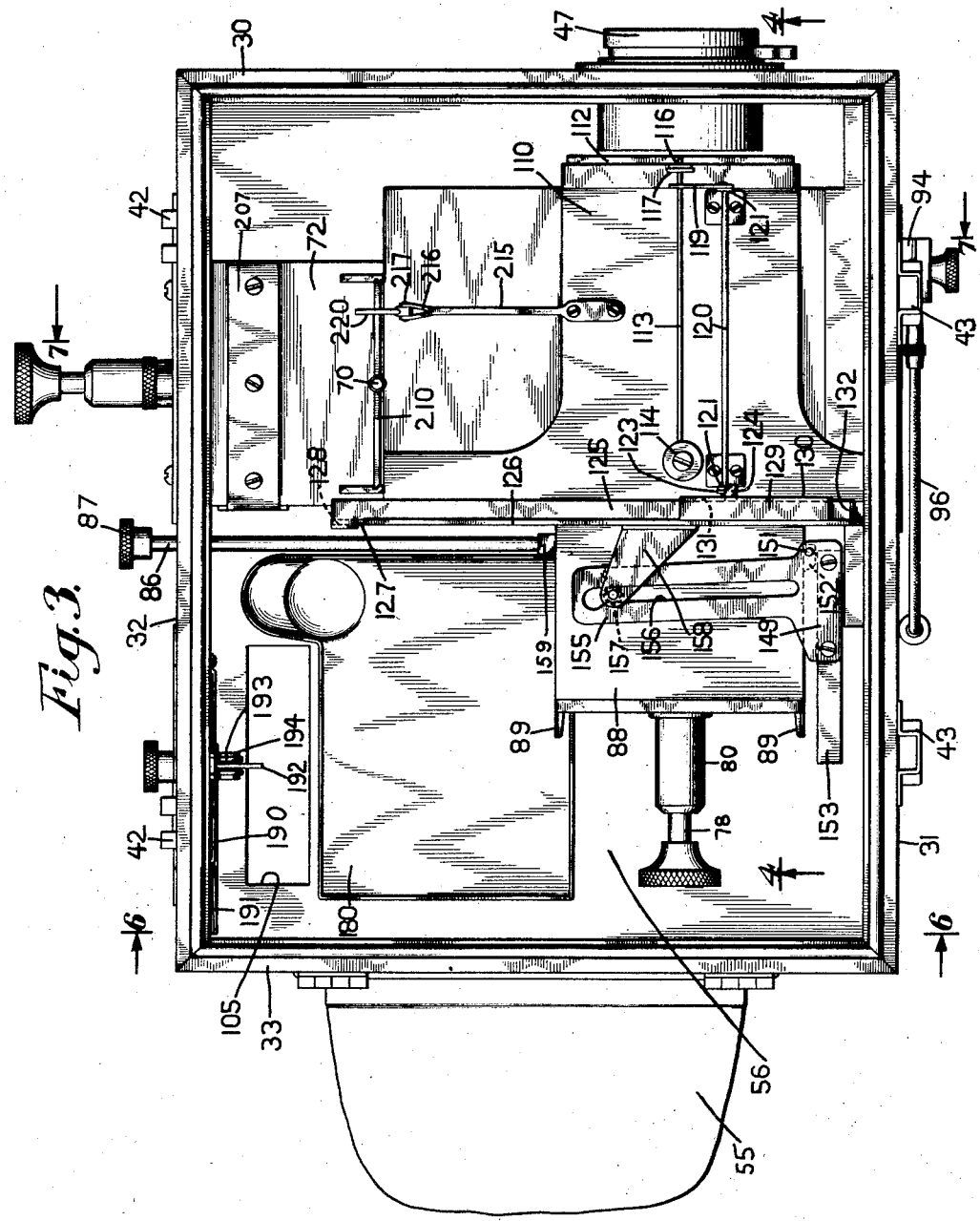
Figure 3 is a view, in plane of the camera with the cover removed to show the general disposition of parts in the interior.

Referring now to Figure 3 it will be observed that immediately in rear of the lens 47 is a chamber 110 of general rectangular outline. This with the lens comprises the camera proper for the making of exposed negatives. This chamber 110 is carried upon a transverse wall 111 which is of a height substantially that of the height of the interior of the box and extends from the right hand wall 31 to within a short distance of the left hand wall 32. The front end of this chamber 110 carries the shutter 112. The shutter 112 is normally retained in closed position by a resilient rod 113 secured toward the rear as at 114 and whereof the front end passes through an aperture in a lug 116 connected with the shutter 112 and guided in a vertical slot formed in the guide lug 117 mounted on the top of the chamber 110. This resilient rod 113 is normally deflected upwardly to close the shutter and is adapted to be depressed to open the shutter by the finger 119 carried on the rock shaft 120 journaled in bearings 121 on the top of the chamber 110. At its opposite end the rock shaft 120 is formed with another finger 123 which extends in a substantially vertical direction and is adapted to be engaged by a lug 124 formed upon a slide 125 adapted to reciprocate along the top of the wall 111 beneath the cover of the box, said slide being guided by a metal plate or strip 126 secured to the rear side wall 111 and partly cut away at its left hand end as at 127 to receive a reversely bent strip engaging shoulder 128 on the slide 125 which retains the slide on the wall and serves as a guide therefor. The slide 125 is held at its opposite end by an angularly bent sheet 129 of stiff material, such as brass, whereof the downwardly deflected portion 130 is secured to the front side of the wall 111 and overlies the slide 125 to form a guide therefor. The angularly formed guide 129 is formed with a slot 131 through which the lug 124 passes to engage the arm 123 on the rock shaft 120. The right hand end of the slide 125 is formed with an upwardly bent tongue 132 for engagement by the actuating plunger 133 of the Bowden wire 134 so that upon pressure on the knob 135 at the end of the Bowden wire in a manner well understood the reciprocation of the slide 125 will effect the opening of the shutter 112 and the shutter may be held open as long as the plunger is pressed inwardly. The shutter will be closed when the plunger 133 is released by the resiliency of the spring rod and its normal tendency to return to original position, and this, of course, will return the slide 125 to retracted position also. On the rearward face of the partition 111 there is formed a strip or track 136 corresponding to the strip 126 at the top of the wall 111 and these two strips 126 and 136 serve the function of slide upon which the magazine 88 travels.

The strips 126, 136 serve as tracks and behind these strips there are formed in the wall 111 grooves 139 adapted to receive irregularly shaped metallic slides 142 carried with the magazine 88 and adapted to reciprocate within the grooves 139 and upon the strips or tracks 126, 136.

This magazine 88 is formed of top and bottom walls 140, 141, respectively, and a removable rear wall corresponding in every particular with the closure 76, described in connection with magazine 72. For convenience, it is numbered similarly to magazine 72 and the description of that magazine applies. The magazine 88 is open at its front end, as at 143, to register with aperture 144 in the wall 111 and with the chamber 110 in front of the wall, as shown clearly in Figure 4.

The magazine 88 is disposed within the developing chamber or dark room 56 in the rear of the partition 111. Its open rear end is closed by a plate or rear wall 76 removably secured in position by the spring clips 89 on opposite sides. The follower 81 carried on the plunger 78 reciprocates in a metallic bearing 80 carried by the removable wall 76 and bears against a pack of sensitized sheets N to press the same, under the influence of the coil spring 79 coiled about the plunger 78 toward the front end of the magazine and against the opening 144 whereby the sheet n at the front of the pack N may be exposed to light rays entering through the lens and a negative formed.

Referring to Figures 3 and 8 it will be observed that the magazine 88 carries on the right hand side thereof a plate 149 pivoted by means of a pivot rod 151 passing through lugs 152 carried on the side of the magazine 88. The plate 149 has secured thereto a frame 153 having a ground glass by which a focus may be made when the magazine 88 is displaced and the plate disposed before the lens 47. The pivot pin is so positioned with respect to the partition 111 as to permit the ground glass to cover the opening 144, as shown in Figure 8, when the magazine is displaced, the frame 153 pivoting from a position in parallel relationship with the partition 111, as shown in Figure 8, upon displacement of the magazine, to a position substantially perpendicular thereto and proximate and substantially parallel with the opening 144 in the side wall of the magazine.

To effect this pivotal movement of the frame 153 the plate 149 at the top is formed with an arm 155 substantially perpendicular thereto which arm is slotted, as at 156, to receive a pin 157 carried on a bracket 158 secured on the rear face of the wall 111. Thus, when the magazine is displaced, from the position shown in Figure 3, the stationary pin 157 in the slot 156 will serve to rotate the ground glass frame 153 about its pivot to the position occupied in Figure 8.

The displacement of the magazine is readily effected by means of the rod 86 journaled in the left hand side wall 32 of the box and threaded at its extreme inner end into a nut 159 mounted upon the side wall of the magazine 88. This rod carries the knurled head 87, previously described, on the outside of the left wall.

It will be observed that the walls of the magazine 88 are spaced from the partition 111 to permit the passage of an ejector. Formed in the wall are downwardly directed guide tracks 165 which are formed with grooves 166 on their proximate faces, respectively, and within these grooves 166 there reciprocates the arms 167 of a generally U-shaped ejector member whereof the base 168 is formed with a tongue 169. On the front side of this tongue 169 is a pin 170 and when the magazine is in register with the lens this pin is received within the transversely directed slot 171 formed in the end of the vertical slide 101 which reciprocates between guides 172 carried on the rear of the partition 111. The bottom and sides of the U-shaped ejector member 167—169 fit closely around the mouth of the opening 144 in the partition 111 which is shown as defined at its top and bottom by the rearwardly directed flanges 173 of the slides 142 carried by the magazine 88, and the side walls of this opening 144 are continuous with the flanges 173 in a vertical direction. The upper end of the arms are formed with rearwardly extending toes 174 which fit within recesses 175 formed in the top of magazine 88 and are of an effective length just sufficient to engage one sensitized sheet so that when a sheet has been exposed and it is desired to eject it, it is merely necessary to pull down the slide 101, thereby drawing down the ejector and drawing with it the exposed sheet to an accessible position within the "dark room" space 56 for convenient grasp by the hand inserted through the hand-hole 54.

In the making of a negative, a pack or stack of sensitized sheets, such as bromide paper, is inserted in the "dark room" space 56 and unwrapped therein by the hand passed through hole 54 so that no light strikes the sheets. The follower having been removed from the magazine 88, as previously described, the unwrapped pack N is then inserted in the magazine and the follower placed in position and released so that the spring 79 may feed the pack N forward against the opening 144.

To focus the camera the magazine 88 is displaced from behind the lens to the position shown in Figure 6 by withdrawing the rod 86 toward the left. This movement of the magazine has previously been described, and by it the ground glass plate is swung in front of the aperture 144 in the partition 111. Since the opening in the magazine lies against the partition 111, as shown in Figure 8, and may be suitably sealed thereabout, the rear wall 33 of the box may be opened and the image formed on the ground glass plate will be plainly visible. The lens may be then adjusted in usual manner to focus the image upon the ground glass plate. Thereafter the door in the rear wall is closed again, the knurled head may be pushed inwardly to slide the magazine to the right in register with the lens. At this time, of course, the pin 170 on the ejector is carried into the slot 171 in the ejecting slide 101 which, of course, remains stationary so far as movement of the magazine is concerned. To make the negative, the shutter is operated as has been described. After the sensitized sheet $n$ has been exposed and in order to develop the negative the slide 101 may be retracted in a downward direction by grasping the knurled head 102 from without the box and since the pin 170 on the ejecting head 168 is disposed within the slot 171 in the slide, the ejector will be drawn downwardly, and the toes 174 engaging the top of the exposed sheet will draw that sheet down to a point below the magazine 88 where it is accessible from the developing chamber 56. The sheet may then be grasped by the hand passing through the opening 54, and the necessary steps of developing and fixing carried out within the "dark room" space 56. An additional container for the necessary washing fluids is shown at 180. In order that the photographer may see what he is doing and note the progress of the development of the sheet, the slide 59 in the cover 35 may be withdrawn from the peep-hole 58. However, this may be done only after the precaution has been observed of placing the eye over the peep-hole so that all light is excluded therefrom.

The peep-hole 58 is normally closed by the slide or closure 59 which reciprocates within the frame 183 on the inner side of the cover 35, the reciprocation in one direction being effected by a lever 184 pivoted on the inner side of the cover 35 to which the slide is attached by means of a link 185. The other end of lever 184 is formed with a quadrant 186 and about this quadrant and about a similar quadrant 187 rotated by the arm 60. The quadrants are connected by a flexible link 189. The movement of the quadrant may be limited by the pins 188.

Light may be admitted within the developing chamber by means of the window 62 in the left hand wall, heretofore referred to. This window, containing a suitable colored glass, is normally closed by a slide 61 which reciprocates within the frame 190 on the inside of the left wall 32 and is normally pressed downwardly to cover the window by the spring 191. The slide 61 is raised to uncover the window and permit the admission of suitably filtered light by a flexible link 192 connected thereto passing over a roller 193 mounted on bracket 194 carried with the side wall and is connected with the slide 59 covering the peep-hole 58 so that when the peep-hole is uncovered, the slide covering the window is automatically raised and light is admitted and vice versa.

Positive making mechanism

After the negative has been properly developed it may conveniently be removed by detaching the tank 106 from the bottom 34 of the box, and picking out the negative, and positive photographs may then be made therefrom. These positives are also formed upon sensitized sheets, such as bromide paper, and the sheets are also preferably utilized from a stack thereon in a magazine.

Referring first to Figure 7 it will be noted that in front of the partition 111 and below the previously described camera proper including lens 47 there is formed a chamber 200 for the passage for light rays between the aperture 90 in the right wall 32 of the box, whereby the multiplying lenses are rendered effective, and a sensitized sheet P which may also be bromide paper. A pack P of such sheets may be disposed in a magazine 201 which is substantially similar in every respect to that heretofore described and contains the spring pressed plunger 78 as previously described. As distinguished from magazine 88 the magazine 201 is stationary and is supported in any convenient fashion adjacent the wall of the chamber 200 and proximate the aperture 202 formed in the wall 200.

The chamber 200 may be formed conveniently of pressed metal and the opening against which the sheet of sensitized paper is disposed for the reproduction of the image may be formed by turning outwardly a portion of the wall as at 203 to form the aperture 202. In the top wall 204 of the magazine 201 there is formed an opening 205 of generally rectangular shape through which the pack P of the sensitized sheets may be inserted when the plunger is withdrawn to the extreme outer position, it being preferably locked in that position as has been described. The opening is closed by a sliding wall section 206 having tapering edges to cooperate with the similarly shaped edges of the top wall 204 and carries at its top a sheet of metal 207 to overlie the adjacent portions of the top and thus support the sliding closure in position. Adjacent the chamber 200 the top wall 204 is cut away slightly as at 208 to permit the passage of an ejector 210 substantially similar to that heretofore described. That is, the ejector comprises a U-shaped frame 167—168 inserted in this instance so that it is the bottom wall of the magazine which is cut away as at 210 to receive the toes 174 which engage one sheet. In this instance, however, the base member 168 carries a threaded lug 211 to receive the threaded end of the ejector rod 70, and as the ejector is reversed in position, the sheet is drawn upwardly through the slot 208. Above the chamber and on top of the camera chamber 110 there is carried a bracket 215 bifurcated at its end 216 and apertured to carry a pivot 217 on the end of a curved ejector finger 218. This ejector 218 may take the form of a curved wire which above the pivot 217 is curved as at 220 toward the left wall of the box so as to lie in the path of the ejector as it is raised and when the ejector is raised and strikes this curved end 220 the deflector is swung toward the left side of the camera so that the lower end 221 which is reversely bent or directed toward the right hand wall of the camera will strike the sensitized exposed sheet and flip it out of the ejector into the space adjacent the left hand wall, where it may be readily grasped by the hand inserted through the hand hole 54 and subjected to the necessary baths in the developing chamber 56.

As has been pointed out hereinbefore, that portion of the apparatus now under discussion is adapted to reproduce from a negative made by the camera proper and held before the aperture 90 in the right hand wall 31 of the box, one or a plurality of positive pictures on the sheet P of sensitized paper in the magazine 201. The negative P is conveniently carried within a frame such as shown in Figures 7 and 16 comprising a carrier 214 having inturned side and bottom edges whereby the sheet may be slid therewithin but readily grasped for removal due to the portion 225 cut out of the back. This carrier 214 is pivotally mounted as at 226 upon a vertically disposed arm 227 of a bracket 104 and is rotatable by means of a knurled head 228 on the outer side of this arm 227. The arm is slotted as at 229 to receive a pin 222 on the carrier 214 whereby the carrier may be rotated from the vertical position shown in full lines in Figure 16 through 90° to the horizontal position indicated in broken lines. The bracket 104, 227 is slidably carried in the bottom frame 103 which has arms 224 extending toward the left hand side of the box to prevent displacement of the foot 104 and thus the bracket may be adjusted whereby the negative carried in the frame may be placed at the proper position with respect to the lenses.

It will be observed that the cards P indicated in Figures 17, 18 and 19 are all of the same size but that in Figure 17 a single image is depicted which extends on the longitudinal axis of the sheet. Figure 17 may also represent the negative n (after development) which may be disposed in the frame 214 and from which the positive p is made, in which event, of course, the image on the positive will be inverted with respect to the image on the negative. To produce the positive x only a single lens is brought in register with the hole 90 in the right hand wall as will be more fully described hereinafter. In Figure 18 two images y, y are disposed in the respective halves of the card p and lie transverse to the longitudinal major axis thereon. To attain a positive of this nature a negative such as represented in Figure 17 is placed in the frame 214 as before, but the frame 214 is rotated at 90° to the position indicated in dotted lines in Figure 16 and two lenses are brought before the hole 90 in the right hand wall. Since the major axis of the negative will be disposed in the horizontal plane and since there are two lenses in operative relation in respect to the hole 2, two horizontal images will be formed on the sensitized plate one on the upper half and one on the lower half as shown at y in Figure 18. In order to form a blank or white space on the positive, such as that indicated at w between the two rectangles containing the positive pictures y so that they may be framed as it were, a partition 230, which is pivoted within the housing 200, is adapted to be automatically rotated upwardly between the lenses into a horizontal position as shown in Figure 12 to provide an obstruction for the light entering through the lenses and subdivide the chamber 200 into what is in effect two cameras.

Figure 19 represents a sensitized sheet upon which four positive images z have been formed. These images z are disposed in each quarter of the sheet p and the images are arranged in generally parallel relationship with the major axis of the sheet. The negative is of course, carried as before in the frame 215 which is disposed vertically as shown in full lines in Figure 16, and four lenses are brought opposite the hole 90 as shown in Figure 13. To give the effect of four rectangular pictures as illustrated in Figure 19 the horizontal blank space w is formed similar to that described in connection with the card containing the two pictures y shown in Figure 18 by means of the horizontal partition 230 heretofore described. In addition and to obtain the vertical blank space v two partitions 231, 232 are rotated into a vertical position as shown in Figure 13.

As has been pointed out the aperture 90 through which the lenses are effective to produce the multi-picture cards shown in Figures 17 through 19 is preferably defined by the metallic frame 91 having the scale 92 along its bottom edge which scale bears three divisions numbered 1, 2 and 4 respectively. When the pointer 95 is brought in register with the point marked 1, a single lens is effective through the opening to produce the picture x shown in Figure 17. When the index is opposite the point marked 2 two lenses are behind the opening 90 and similarly when at the point 4, four lenses are brought into operative position.

The various lenses and shutters are contained within a metallic casing indicated at 240 in Figure 7. This casing 240 forms the right hand wall of the chamber 200. The casing 240 itself is formed as shown in Figure 9 of the outer wall 241 and the inner wall 242. The inner wall is flanged as at 243 and is secured to the chamber 200 while the outer wall 241 is secured outwardly thereof and spaced therefrom below by the flange 244. It is provided with an elongated aperture 245. The inner wall 242 is formed with an aperture 246 approximately the size of the opening 90 and is defined by the outwardly turned flange 247. The front wall 241 is slidable on lower and upper tracks 248, 249 respectively and carries on the outer side upper and lower guides 250, 251 respectively which are grooved on their proximate faces as at 252 to receive a shutter plate 254. Between the shutter plate 254 and the outer wall 241 is arranged a stationary plate 255 formed with groups of apertures 260 and 261, 262 and 263 respectively. Immediately inside the stationary plate 255 is the lens frame 265 containing the lenses 266, one behind each apertures 261, 262, and 263.

Figure 10:
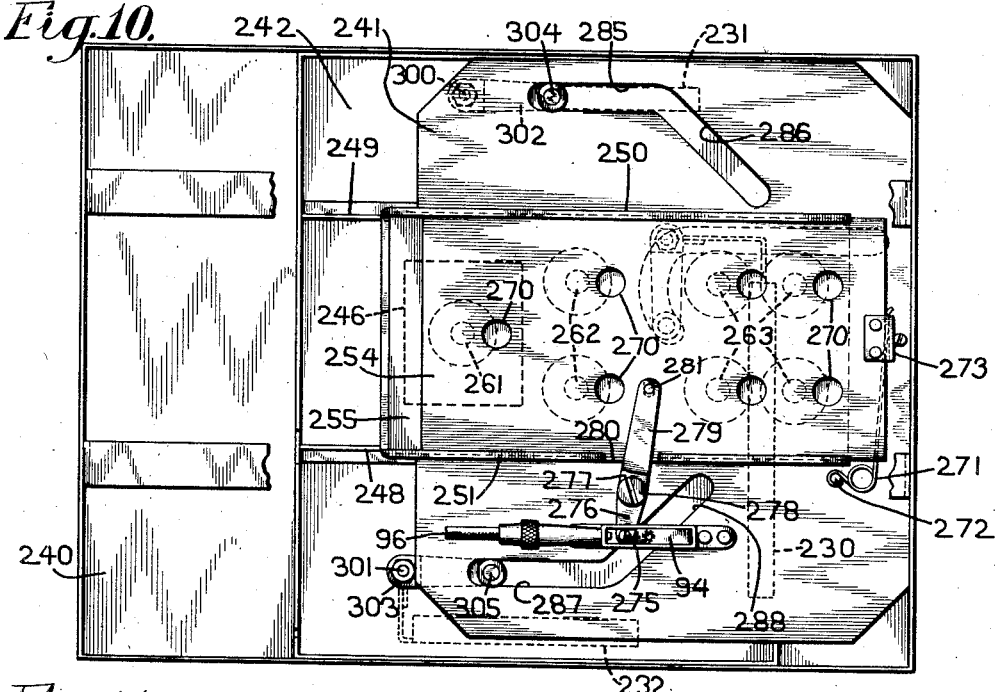
Figure 10 is a view in longitudinal vertical section taken in the plane indicated by the line 10—10 in Figure 7 and showing devices including lens and shutter mechanism by which the various lenses are brought to position to reproduce the negative in positive form.

The slide 94 extends through the slot 93 and is secured as by rivets directly to the outside wall 241 which is reciprocable upon the track formed of the horizontal rails 248, 249. Toward the rear end of the fixed plate 255 there is a single lens aperture 261 behind which is a lens 266. Adjacent lens aperture 261 are two lens apertures 262 also having lenses 266 therebehind and disposed on the same vertical axis. Forwardly of the two lens apertures 262 is a group of four lens apertures 263 arranged in rectangular formation behind which are four lenses 266 respectively. Thus when the slide 94 is moved so that the index 95 carried thereon is opposite the point marked 1 on the scale 92 the single lens aperture 261 is centrally disposed with respect to the hole 90 as shown in dotted lines in Figures 1 and 10. The shutter member 254 is formed with a plurality of groups of apertures 270 adapted to register with the lens apertures 261, 262 and 263 and lenses 266 respectively but are normally displaced from register with the lens apertures as seen in Figure 10. This displacement is effected by a spring 271 secured at one end to a pin 272 on the slidable outer wall 241 and at the other end is carried by a clip 273 fastened to the edge of the shutter member 254. The end of the Bowden wire 96 is shown as mounted in the slide 93 and is adapted to actuate and bear against a pin 275 secured to the lower and shorter arm 276 of the lever 277 of the first order rotatably mounted as at 278 upon the slidable wall 241. The other arm 279 of lever 277 passes through a cut away portion or slot 280 in the lowermost guide 251 and is pivotally connected as at 281 at its upper end to the shutter member 254. Thus until the Bowden wire 96 is actuated, the holes 270 in the shutter are displaced with respect to the lenses under the influence of the spring 271 so that the lenses are normally covered and the lever 277 lies in a position as illustrated in Figure 10. When, however, the Bowden wire is pressed to rock the lever 277 about its pivot, the shutter member is moved to the rear so that the holes in the shutter are in register with the lens apertures and lenses to expose the sensitized sheet $p$. Dependent of course upon the position of the outer wall 241 with respect to the opening 90 one or a plurality of lenses are disposed in operative position. Thus in Figure 10 the single lens is shown as disposed centrally of the hole to form the picture $x$ whereas in Figure 11 four lenses are before the opening 90.

This movement of the outer slidable wall 241 effected by the movement of the slide 94 also brings the horizontal partitions 230 and vertical partitions 231, 232 into position as previously described. It will be observed that the slidable wall 241 is formed with a slot 285, 286 in its upper portion and another slot 287, 288 in its lower portion. The rearward ends 285, 287 of both slots extend in a substantially parallel and horizontal direction while the forward ends 286, 288 are directed respectively toward the lenses, at an angle to the horizontal axis of the parallel portions 285, 287. Between the upper and lower slots 285, 287 and 286, 288 in the movable outer wall 241 and at its forward end, there is formed a slot 289, 290 whereof the forward end 290 extends in a horizontal direction and the rearward end is reversely curved as at 289.

When the single lens aperture 261 is before the opening as shown in Figure 10 no partitions are used, the partition 230 occupying a vertical position against the front wall of the chamber 200 and the partitions 231 and 232 occupying horizontal positions adjacent the top and bottom walls of chamber 200 respectively.

Figure 11:
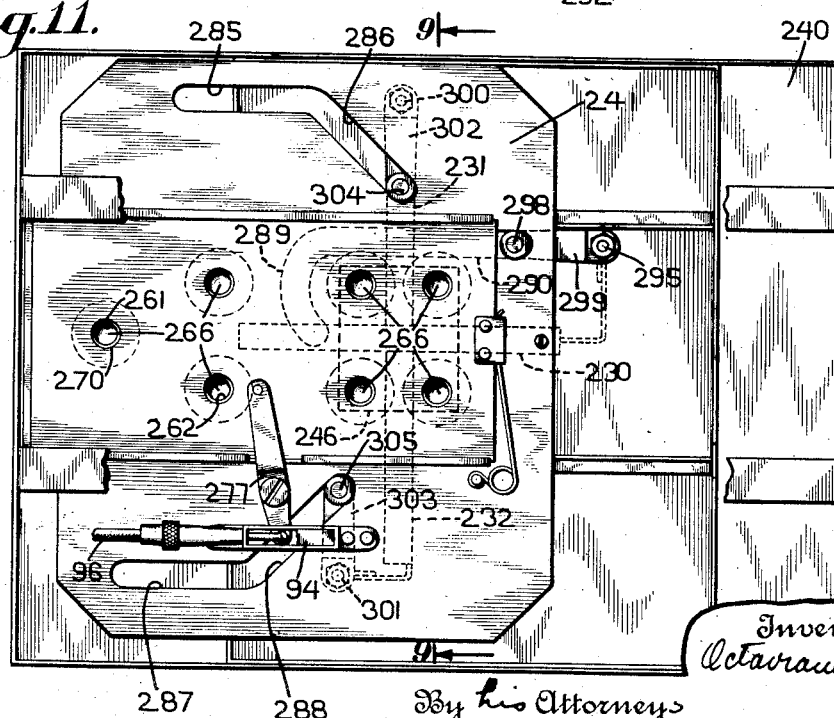
Figure 11 is a view similar to Figure 10 but showing the apparatus in position for forming four positive images upon a single sheet.

The partition 230 used in subdividing the sheet in two equal parts is shown in Figures 10 and 11 as being mounted upon a pivot 295 and comprising an L-shaped or angularly formed sheet of metal bent around the pivot with its longer side bisecting the hole opening 246 and the sheet of sensitized paper when in operative position as shown in Figure 11. The longer leg of sheet partition 230 carries flanges 296 transversely thereon to give the partition 230 a relatively broad dimension vertically, to wit, a dimension which will afford the blank space indicated at $w$ in Figures 18 and 19. When the group of two lenses is brought before the opening 90 as shown in Figure 12 the pivot rod is caused to rotate to swing the horizontal partition from its out of the way position shown in Figure 4 to the horizontal position shown in Figure 12 until it abuts against a stop or bracket 297 carried with the rear wall of the chamber 200. This rotation is effected upon the movement of the outer wall 241 from the position shown in Figure 10 to a position midway therebetween. The slot 289, 290 receives a roller 298 carried upon the end an arm 299 on the rock shaft 295 heretofore described normally when in out of the way position roller 298 lies in the lowermost end of the curved groove portion 289. As the wall 241 is moved to bring the two lenses in operative relation with respect to the hole the roller 298 is compelled to follow the curved slot 288 and thereby rotate the rock shaft 295 to swing the partition 230 into a horizontal position as shown in Figure 11. Thereafter of course further movement of the wall 241 toward the rear maintains the partition 230 in horizontal position due to the fact that the roller 298 remains in the horizontal portion 290 of the slot and thus the partition 230 remains in a horizontal position when both the group of two lens openings 261 and the group of four lens opening 262.

The vertical partitions 231, 232 are similarly mounted on rock shafts 300, 301, respectively, having arms 302, 303 mounted at the required angle so that the respective rollers 304, 305 carried thereby, when travelling in the slots 285, 287 and 286, 288 will move the vertical partitions from horizontal position to vertical position when the group of four lens apertures and lenses are brought behind the opening 90 as will be understood. When the single lens opening and the group of two lens opening are behind opening 90 the horizontal portions 285, 286 of the slots maintain the partitions 231, 232 in their horizontal positions when the movement of the wall is such as to bring either the one lens or the group of two lenses in operative position but when the group of four lenses is brought behind the opening 90 the angularly disposed portions 287, 288 of the slots serve to move the partitions 231, 232 to vertical position.

It is believed that the operation of the picture making mechanism forming the subject matter of this invention will be apparent from the foregoing description. Within the box 30—35 everything necessary to the making of a finished positive photograph is contained and thus the box may be conveniently carried about, say, by an itinerant photographer in plying his trade.

When the subject is to be photographed the box 30—35 is set up on a tripod by securing the tripod to the table 100 and the general direction obtained by the use of the sights 64, 65.

Thereafter an exact focus of the lens 47 may be obtained, for the purpose of making a negative, by pulling out on the knob 87 to move the magazine 88 away from the front of the lens 47 and swing the ground glass into the focus of the lens. Upon opening the door 51 in the rear wall 33 the photographer may see the image on the ground glass and make the necessary adjustments. The magazine is of course then returned to position behind the lens by pushing the rod 86 in again.

Before or after focusing a pack of sensitized sheets N, wrapped against the deleterious effects of light, is inserted in the developing chamber 56 and unwrapped by the hand inserted through the opening 54 which is sealed against the admission of light therein by the sleeve 55 surrounding the photographer's arm.

The magazine 88 is opened to receive the unwrapped pack N by disengaging the spring clips 89 and removing the rear wall 76 and with it of course the follower 81 and associated mechanism. After their removal and the insertion of the pack N the follower 81 is again inserted and the rear wall made fast by the spring clips 89.

The negative $n$ is then made by actuating the shutter 112 by the Bowden wire actuating device 134. It is then ejected from the magazine 88 by drawing down the knob 102 which brings down the ejector 167, 169 into the space 56 below the magazine 88 and the toes 174 carry with it the exposed negative which may then be easily grasped by the photographer's hand inserted through the hand hole 54 and developed within the space 56. It may then be removed for the purpose of making one or more positives therefrom.

More negatives may be of course made at once, until the supply of sensitized sheets $n$ in the magazine 88 is exhausted. It is to be noted that the magazines are each capable of accommodating a great many sensitized sheets. In the preferred embodiment a hundred may be accommodated.

To make positives $p$ from the negative $n$, the negative $n$ is set in the carrier 215 in front of the opening 90 in the left hand wall 31. Assuming now that four positive reproductions are desired on a single sheet, the index 95 is moved to point to the numeral 4 on the scale 92 and the movement of the index 95 and the slide 94 with which it is carried serve to bring the group of four lens apertures and lens behind the opening 90 and moves the partitions 230, 231 and 232 into position to divide the transverse camera into what is in effect four cameras as has been described.

Of course, before the positives can be made a pack of sensitized sheets must be inserted into the developing chamber and unwrapped as before described. The slide 206 is then removed from the top wall 204 of magazine 201 and the pack P inserted in the magazine through the opening 205, the follower 81 having been retracted and locked in retracted position as before. The follower 81 is then released to force the pack up against the opening 202 in the transverse camera chamber 200.

The shutter plate 260 may then be actuated by the Bowden wire 96 and four positive images $z$ formed on the sheet $p$, suitably framed and separated by the blank spaces $w$ and $v$. It may be noted here as illustrated in Figures 17, 18 and 19 that the four positive images are not reduced in size. That is the four lenses are so arranged in the group and are so proportioned that the features are represented in Figure 19 in the same relative size as in Figure 17 but that instead of, say, a three-quarter length figure in Figure 17, merely the head and shoulders are depicted. Similarly with respect to Figure 18, the two images are formed as half length photographs while the size of the features remains constant.

It may be noted here that the formation of the positive pictures is effected by a photographic operation similar to the making of the usual negative from a negative used as the object and set up at a focus of the lenses and that light of any convenient source may be availed of for the operation.

After the positive is focused the photographer may eject the exposed sheet $p$ from magazine 201 by drawing up on the knob 69 which causes the movement of ejector 208 out of the magazine 201 to a position thereabove. The upward movement of the ejector 208 actuates the ejector finger 218 to flip the exposed positive $p$ out of the ejector frame 208 within easy grasp of the photographer's hand inserted through hand hole 54 as before and as before the positive $p$ is developed and fixed in the chamber 56. Of course any number of positives may be made from the same of different negatives limited only by the number of sensitized sheets in the magazine 201.

Various modifications will occur to those skilled in the art in the form taken by the various instrumentalities going to make up the picture taking device as well as in the composition thereof. Certain of these instrumentalities are capable of independent use as well as use in combination with certain or all of the others and no limtiation is intended by the phraseology used in the foregoing description or illustrations in the accompanying drawings except as set forth in the appended claims.

What I claim is:

1. In a camera, in combination, a plurality of groups of lenses, shutter means therefor, and means to selectively move a lens group into operative position in the camera.

2. In a camera, in combination, a box formed with an opening in one wall thereof, a plurality of groups of lenses, shutter means therefor, and means to selectively move a lens group into operative position in the opening.

3. In a camera, in combination, a box formed with an opening in one wall thereof, guides carried with the wall inwardly of the opening, a lens carrier slidable on the guides, a plurality of groups of lenses in the carrier, shutter means carried with the lens carrier and means to selectively move the carrier to bring a lens group into operative position in the opening.

4. In a camera, in combination, a box having an opening in one wall thereof and a slot therebelow, a plurality of groups of lenses, shutter means for the opening, means to selectively move a lens group into operative position with respect to the opening and means to actuate the shutter, said means being accessible from without the camera and passing through the slot.

5. In a camera, in combination, a plurality of groups of lenses, shutter means, means to selectively move a lens group into operative position in the camera, and means to subdivide the camera in accordance with the disposition of lenses in operative position.

6. In a camera, in combination, a plurality of groups of lenses, shutter means, means to selectively move a lens group into operative position in the camera, and means dependent upon the movement of the lenses to subdivide the camera in accordance with the disposition of lenses in operative position.

7. In a camera, in combination, a box having an opening in one wall, a plurality of groups of lenses, shutters therefor, means to selectively move a lens group and the shutter therefor into operative position behind the opening, means to subdivide the camera in accordance with the disposition of lenses in operative position, and means to effect the simultaneous operation of both said means.

8. In a photographing device, in combination, a box, a chamber within the box, a magazine for sensitized sheets at one side of the chamber, a plurality of groups of lenses selectively movable into operative position with respect to the opposite side of the chamber, shutter means for said lenses, and means to subdivide the chamber into a plurality of cameras in accordance with the disposition of lenses in the group in operative position.

9. In a photographing device, in combination, a box, a chamber within the box having openings in opposite walls thereof, a magazine for sensitized sheets operatively associated with one opening, a plurality of groups of lenses, each group being selectively movable into register with the other opening, and shutter means for said lenses.

10. In a photographing device, in combination, a box, a chamber within the box having openings in opposite walls thereof, a magazine for sensitized sheets operatively associated with one opening, a plurality of groups of lenses, each group being selectively movable into register with the other opening, shutter means for said lenses, and ejector means to remove an exposed sensitized sheet from the magazine.

11. In a photographing device, in combination, a box, a chamber within the box having openings in opposite walls thereof, a magazine for sensitized sheets operatively associated with one opening, a plurality of groups of lenses, each group being selectively movable into register with the other opening, shutter means for said lenses, means to subdivide the chamber into a plurality of cameras in accordance with the disposition of lenses in the group before the opening and dependent upon the movement of the lenses, and ejector means to remove an exposed sensitized sheet from the magazine.

12. In a photographing device, in combination, a box, a chamber within the box, a magazine for sensitized sheets operatively associated with one side of the chamber, a plurality of groups of lenses, each group being selectively movable into operative position opposite the magazine, shutter means for said lenses, and partitions to subdivide the chamber into a plurality of cameras in accordance with the disposition of the lenses in the group in operative position and dependent upon the movement of the lenses.

13. In a photographing device, in combination, a box, a chamber within the box, a magazine for sensitized sheets operatively associated with one side of the chamber, a plurality of groups of lenses, each group being selectively movable into operative position with respect to the magazine, shutter means for said lenses, partitions to subdivide the chamber into a plurality of cameras in accordance with the disposition of lenses in the group in operative position, and means dependent upon the movement of the lenses to move the partitions into operative position.

14. In a photographing device, in combination, a box, a chamber within the box, means to support a sensitized sheet in the chamber, a plurality of groups of lenses, each group being selectively movable to focus upon the sensitized sheet, movable partitions to subdivide the chamber into a plurality of cameras in accordance with the disposition of lenses in the group in focusing position and means dependent upon the movement of the lenses to selectively move the partitions.

15. In a photographing device, in combination, a box, a chamber within the box, means to support a sensitized sheet in the chamber, a plurality of groups of lenses, each group being selectively movable into position to focus upon the sheet, a partition supported within the chamber and movable into a transverse position therein to subdivide the chamber into a plurality of cameras and means dependent upon the movement of the lenses to move the partitions.

16. In a photographing device, in combination, a box, a chamber within the box, means to support a sensitized sheet in the chamber, a plurality of groups of lenses, each group being selectively movable into position to focus upon the sheet, a partition pivoted adjacent one side of the chamber and rotatable into a transverse position to subdivide the chamber into a plurality of cameras and means dependent upon the movement of the lenses to rotate the partition.

17. In a photographing device, in combination, a box, a chamber within the box, means to support a sensitized sheet in the chamber, a plurality of groups of lenses, each group being selectively movable into position to focus upon the sheet, a partition pivoted adjacent one side of the chamber and rotatable into a transverse position, partitions pivoted adjacent the top and bottom of the chamber, respectively, and movable into a plane normal to the first named partition, said partitions being adapted to divide the chamber into a plurality of cameras in accordance with the disposition of the lenses in the group focused upon the sensitized sheet and means dependent upon the movement of the lenses to selectively rotate the partitions into operative positions.

18. In a camera, in combination, means to support a sensitized sheet within the camera and a plurality of groups of lenses so proportioned and disposed within the groups that the photographs formed thereby on the sheet are equal in number with the lenses in a group and the features of the respective photographs produced by lenses of different groups are of equal size.

In testimony whereof I affix my signature.

OCTAVIANO DIAZ.